US011512436B2

(12) United States Patent
Delgado et al.

(10) Patent No.: US 11,512,436 B2
(45) Date of Patent: Nov. 29, 2022

(54) ROAD POLLUTION EXTRACTION SYSTEM

(71) Applicant: Delgado Capital Limited, Hertford (GB)

(72) Inventors: Thomas Delgado, Hertford (GB); Stephen Partridge, Hertford (GB); Stephen Haley, Hertford (GB)

(73) Assignee: DELGADO CAPITAL LIMITED AT MANUFACTORY HOUSE, Hertfordshire (GB)

( * ) Notice: Subject to any disclaimer, the term of this patent is extended or adjusted under 35 U.S.C. 154(b) by 535 days.

(21) Appl. No.: 16/604,840

(22) PCT Filed: Apr. 12, 2018

(86) PCT No.: PCT/GB2018/050972
§ 371 (c)(1),
(2) Date: Oct. 11, 2019

(87) PCT Pub. No.: WO2018/189543
PCT Pub. Date: Oct. 18, 2018

(65) Prior Publication Data
US 2020/0087866 A1    Mar. 19, 2020

(30) Foreign Application Priority Data
Apr. 13, 2017   (GB) .................................. 1705984

(51) Int. Cl.
*B01D 50/00*   (2022.01)
*E01C 1/00*    (2006.01)
(Continued)

(52) U.S. Cl.
CPC ............ *E01C 1/005* (2013.01); *B08B 15/002* (2013.01); *B01D 46/58* (2022.01); *B01D 46/645* (2022.01); *B01D 2279/40* (2013.01)

(58) Field of Classification Search
CPC ....... E01C 1/005; B08B 15/002; B01D 46/58; B01D 46/645; B01D 2279/40; E01F 9/553
See application file for complete search history.

(56) References Cited

U.S. PATENT DOCUMENTS 3,731,459 A * 5/1973 Foster ..................... E01C 1/005
                                              55/467
3,898,059 A * 8/1975 Foster ..................... E01C 1/005
                                              95/218

FOREIGN PATENT DOCUMENTS

FR    2760822 A1    9/1998
GB    2525645 A    11/2015
(Continued)

OTHER PUBLICATIONS

International Search Report PCT/ISA/210 for International Application No. PCT/GB2018/050972 dated Jun. 15, 2018.
(Continued)

*Primary Examiner* — Dung H Bui
(74) *Attorney, Agent, or Firm* — Harness, Dickey & Pierce, P.L.C.

(57) ABSTRACT

A system for extracting polluted air in the vicinity of a road surface, the system comprising at least one inlet assembly arranged to be recessed into the road surface and to be connected to an extraction duct, said at least one inlet assembly comprising: a pod arranged to protrude above the level of the road surface and to be driven over; and one or more intakes located within the pod, the pod defining a passage arranged to be connected to an extraction duct.

15 Claims, 11 Drawing Sheets

(51) Int. Cl.
  *B08B 15/00* (2006.01)
  *B01D 46/58* (2022.01)
  *B01D 46/62* (2022.01)

(56) References Cited

FOREIGN PATENT DOCUMENTS

| | | |
|---|---|---|
| JP | H0724245 A | 1/1995 |
| TW | 201527623 A | 7/2015 |

OTHER PUBLICATIONS

Written Opinion of the International Searching Authority PCT/ISA/237 for International Application No. PCT/GB2018/050972 dated Jun. 15, 2018.

\* cited by examiner

ROAD POLLUTION EXTRACTION SYSTEM

The present invention relates to a system suitable for extracting polluted air in the vicinity of a road surface and particularly, but not exclusively, a system which can be located close to the source of emissions and which is arranged to minimise the intake of water into the system.

Air pollution generated from road vehicles emissions is a continuing problem in modern towns and cities. The problem is particularly prevalent where road networks are highly congested and traffic moves at a relatively slow pace.

Purification systems exist for the treatment of polluted air to remove particulates and filter out hazardous gases, however there remains a need for systems capable of effectively extracting polluted air from open spaces such as road networks, which can then subsequently be fed into such purification systems in order to be purified and returned to the atmosphere or to be simply dispensed directly to the atmosphere. In particular, it is desirable to design a system such that polluted air can be extracted from the vicinity of a road surface as close as possible to the source of the emissions, namely the vehicles using the road network, thus minimising the opportunity for foul air to disperse into the immediately surrounding atmosphere or to be drawn into the vehicle interiors.

Some systems are known which attempt to provide such an extraction system employing a plurality of suction inlets located at the side of road to extract polluted air in the vicinity of a road surface to a common pipeline or duct located beneath or near the road, where it is subsequently transported to a purification system or unit.

One such pollution management system is disclosed in UK Patent Application No GB 2525645 A, which comprises an array of inlets arranged to collect polluted air and to supply the polluted air to a polluted air treatment element. The inlets of this system may be raised inlets or grills located at the side of a road.

It is the object of the present invention to provide an improved system for extracting polluted air in the vicinity of a road surface.

According to the present invention there is provided a system for extracting polluted air in the vicinity of a road surface, the system comprising at least one inlet assembly arranged to be recessed into the road surface and to be connected to an extraction duct. The at least one inlet assembly comprises a pod arranged to protrude above the level of the road surface and to be driven over, and one or more intakes located within the pod, the pod defining a passage arranged to be connected to an extraction duct.

The present invention provides a means to extract foul air emitted by traffic using a road into which the system is installed. Each inlet assembly is arranged to receive foul air drawn into the system from the vicinity of the road surface via the one or more intakes located within the pod. A major advantage of the present invention is that the pod is arranged to be driven over, allowing each inlet assembly to be placed in any desired location within the road surface without inhibiting or disrupting the movement of traffic over it. The at least one inlet assembly may therefore be placed at a location as close as possible to the source of emissions, thus optimising the extraction of polluted air from the vicinity of the road surface.

The term 'pod' used herein refers to a component of the inlet assembly which may be inserted into the base unit to form the inlet assembly of the present invention. A pod according to the present invention may take any shape or configuration, including substantially linear or substantially circular configurations, depending on the requirements of a specific inlet assembly installation, and thus is not limited to any particular shape or configuration.

The pod may preferably be resiliently compressible and/or retractable. In this manner, a wheel passing over the pod will cause the pod to compress and/or to retract, causing minimal disruption to the motion of a wheel passing over the at least one inlet assembly. Advantageously, this allows each inlet assembly to be placed at any desired location within the road surface and thus allows the at least one inlet assembly to be located as close as possible to the source of emissions. Most preferably, when the pod is in a compressed and/or retracted state, an upper surface of the pod is substantially flush with the level of the road surface.

Preferably, each inlet assembly may further comprise an internal stop, arranged to limit the compression and/or retraction of the pod and to support to some extent a wheel passing over the pod. This prevents excessive deformation and potential damage to the pod and may thus prolong the life of the pod.

Each inlet assembly may preferably comprise a base unit arranged to be embedded in a road surface and to accommodate the pod. Each base unit may comprise an upper edge arranged to be substantially flush with the road surface. The base unit may also comprise a housing into which the pod may be inserted and by which the pod may be supported.

The base unit may preferably comprise one or more retaining members arranged to engage with the pod so as to retain the pod within the base unit. Advantageously, the retaining members prevent the pod from being readily removed from the base unit. A bottom portion of the base unit may be provided with a raised middle section, which raised middle section contacts an inner portion of the pod to retain the pod in position and prevent the pod from being readily removed from the base unit.

The base unit may further comprise an outwardly extending flange, which flange is arranged to be embedded in the road surface so as to securely position the base unit within the road surface.

In some embodiments of the present invention, the base unit may comprise a sub-housing biased to a raised position and arranged to provide a housing for the pod. The sub-housing may be biased by means of one or more springs. Advantageously, the base unit may further be provided with a slideable connector arranged to connect the base unit to the sub-housing, allowing the sub-housing to move within the base unit along a substantially vertical axis. The sub-housing is thereby retractable into the base unit. In this manner, a wheel passing over the pod urges the pod against the base of the sub-housing, causing the sub-housing to retract into the base unit. As such, minimal disruption is caused to the motion of a wheel passing over the at least one inlet assembly.

The sub-housing may further comprise a duct portion arranged to be connected to an extraction duct.

Preferably, the pod comprises a head section arranged to protrude above the level of the road surface, wherein an upper surface of the head section defines an outer surface of the pod, said outer surface being arranged, in use, to be contacted by a wheel passing over the pod.

The head section may comprise an outer shell, which is arranged to protrude above the level of the road surface and which comprises a rounded peripheral edge arranged to form a seal to the road surface. Advantageously, this prevents the intake of water into the at least one inlet assembly and acts to cushion the impact of the peripheral edge of the outer shell against the road surface when a wheel passes over each inlet assembly. In alternative embodiments, the pod is arranged to compress and/or retract such that all parts of the pod are beneath or substantially flush with the level of the road surface when the pod is in a compressed and/or retracted state.

Preferably, the pod comprises a support plate located beneath the head section, or embedded within the head section, to provide structural integrity to the head section and to support a wheel passing over the pod, at least to some extent. Where the pod comprises a support plate, the intakes are preferably formed through the head section and the support plate to allow foul air to pass from the vicinity of the road surface into the passage defined by the pod.

The pod may comprise one or more side walls arranged to support the head section. Preferably, the side walls are provided with one or more apertures, which form all or some of the intakes of the pod. The side walls may be resiliently compressible to facilitate compression and/or retraction of the pod into the base unit under the force applied by a wheel passing over the pod. The resilience of the side walls allows the pod to return to a raised position once the applied force is released.

The head section and the side walls may be unitarily formed. However, in alternative embodiments, the head section and the side walls may be separately formed and subsequently attached, directly or indirectly. The head section and the side walls may be connected through the support plate.

In some embodiments of the present invention, the side walls are substantially rigid, and the pod further comprises at least one compressible support member positioned underneath each side wall to allow compression and/or retraction of the pod. The compressible support member may comprise one or more springs. The compressible support member may alternatively or additionally comprise a compressible rubber bed.

The pod may comprise an internal cavity. Advantageously, the internal cavity may be shaped to ensure correct airflow through the passage defined by the pod and towards an extraction duct to which the pod is arranged to be connected. The internal cavity forms a central duct running along the pod connecting the intakes to the extraction duct.

One or more of the intakes may be raised above the level of the road surface, such that they are above the level of any normally expected surface water. This provides the advantage that water at the level of the road surface will be prevented from entering the at least one inlet assembly through said intakes. The intakes may be positioned at least 1 cm above the level of the road surface.

The pod may comprise a mesh material arranged to cover the one or more intakes to inhibit the inlet of water droplets to the at least one inlet assembly. The mesh material may protrude above the upper surface of the pod in order to encourage the run-off of water droplets therefrom.

The pod may comprise one or more reflectors and/or one or more lighting units, thus improving the visibility of the at least one inlet assembly. The at least one inlet assembly may thereby be used to provide various road markings, such as traffic delineation markings. One or more of the lighting units may optionally be configured to illuminate a portion of the road surface in the vicinity of each inlet assembly. The pod may additionally comprise at least one solar panel to provide power to electrical components of the pod, such as the lighting units.

In one embodiment of the present invention, the system may comprise a plurality of inlet assemblies aligned in a road surface to provide reflective or illuminated traffic delineation markings. Advantageously, the system may therefore provide a combination of polluted air extraction and traffic delineation markings.

The inlet assembly may have a linear configuration or may be circular.

The system may further comprise an extraction duct connected to the at least one inlet assembly. Preferably, the system may also comprise means configured to draw air from the road surface, through the pod and into the extraction duct. The means for drawing the air may be a fan or a pump. In one preferred embodiment, the system may also comprise an air filtration unit connected to the duct, the filtration unit being configured to receive air from the duct, to extract hazardous gases and particulate matter from the air and to return the purified air back into the atmosphere. The system may further comprise a sump pump arranged to extract water which has entered the system through the inlet assemblies.

Non-limiting embodiments of the invention will now be described, by way of example only, with reference to the accompanying drawings in which:

FIG. 4b is a cross-sectional view of a section of the core and the outer shell of the inlet assembly through line X-X as shown in FIG. 4a;

Figure 1:
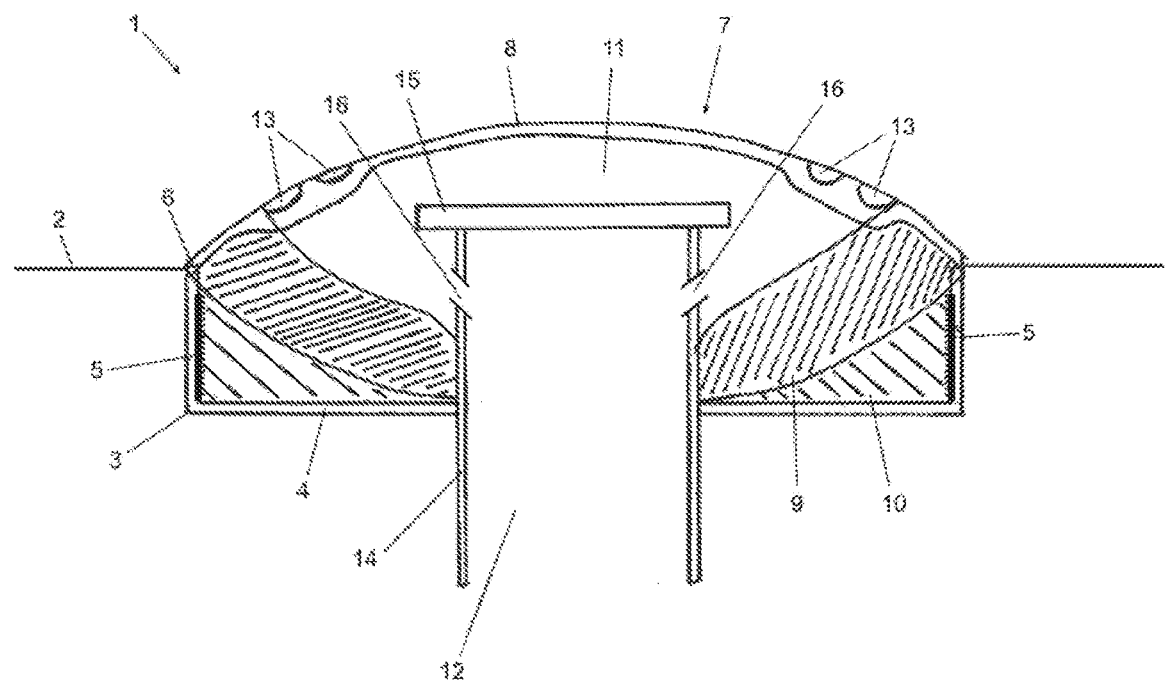
FIG. 1 is a cross-sectional side view of an inlet assembly in accordance with one embodiment of the present invention.

With reference to the Figures, there is shown various embodiments of the system according to the present invention. A first embodiment of the inlet assembly is shown in FIGS. 1 to 5, having a generally circular configuration. The inlet assembly, indicated generally as 1, is arranged to be recessed into a road surface 2. The inlet assembly 1 comprises a base unit 3 recessed into the road surface 2, the base unit 3 having a bottom portion 4 and an internally threaded wall 5. The upper edge 6 of the base unit is arranged to be substantially flush with the level of the road surface 2. The inlet assembly 1 further comprises a pod 7 having an outer shell 8, a core 9 and a seat 10, the pod 7 defining an internal cavity 11 and a passage 12. The passage 12 is connected to an extraction duct (not shown). The pod 7 is arranged to protrude above the level of the road surface 2 and to be driven over. An important advantage of the present invention is that it permits the inlet assembly to be located at any desired location within the road surface whilst causing negligible disruption to traffic moving along the road. The inlet assembly 1 can therefore be positioned as close as possible to the source of the polluted air, thus maximising the efficiency of the system in extracting polluted air from the vicinity of the road surface.

Intakes 13 are formed in the outer shell, allowing polluted air in the vicinity of the road surface 2 to pass through the intakes 13 into the passage 12, from which it can subsequently pass into the extraction duct. The intakes 13 are raised above the level of the road surface 2, such that they are above the level of any normally expected surface water. This arrangement has the advantage that the pod 7 limits the intake of water from the road surface 2 into the inlet assembly 1 and subsequently into the extraction duct. Preferably, the intakes 13 are positioned between 1 cm and 3 cm above the level of the road surface. However, in alternative embodiments the intakes may not be positioned above the level of the road surface and water ingress is address by other means, such as the installation of a sump pump within the system.

The core 9 supports the outer shell 8 and can act to limit any compression or retraction of the outer shell 8, as will be subsequently described. In combination, the outer shell 8 and the core 9 define the internal cavity 11, which is shaped to ensure correct air flow from the internal cavity 11, through the passage 12 and into an extraction duct. Core 9 is supported by and bonded to a seat 10, which has a threaded outer wall, such that the seat 10 is arranged to engage with the threaded wall 5 of the base unit 3. Electrical components of the pod are housed within the core 9 and/or the seat 10.

In some embodiments of the present invention, the outer shell 8 is resiliently compressible. A wheel of a vehicle passing over the pod 7 thereby causes the outer shell 8 to compress. The pod 7 shown in FIG. 1 further comprises a conduit 14 extending into the internal cavity 11 along the passage 12, supporting an internal stop 15, which is arranged to limit the compression or retraction of the outer shell 8, in combination with the core 9. When the pod 7 is compressed by a wheel, outer shell 8 rests against the internal stop 15, which thereby to some extent supports the wheel passing over the pod 7. Once the wheel has passed over the pod 7, the outer shell 8 is arranged to resile to the original shape shown in FIG. 1. In order to allow airflow from the internal cavity 11 to the passage 12, one or more apertures 16 are formed in the wall of the conduit 14.

Outer shell 8, core 9 and internal stop 15 may be formed of a hard but relatively deformable rubber. This allows the inlet assembly 1 to absorb the force of a wheel passing over it. The seat 10 may be formed of rigid plastic to support the core 9 and to facilitate engagement with the base unit 3 by the screw thread. However, it will be appreciated that the various components of the pod 7 can be formed of any appropriate material having sufficient durability.

Figure 2A:
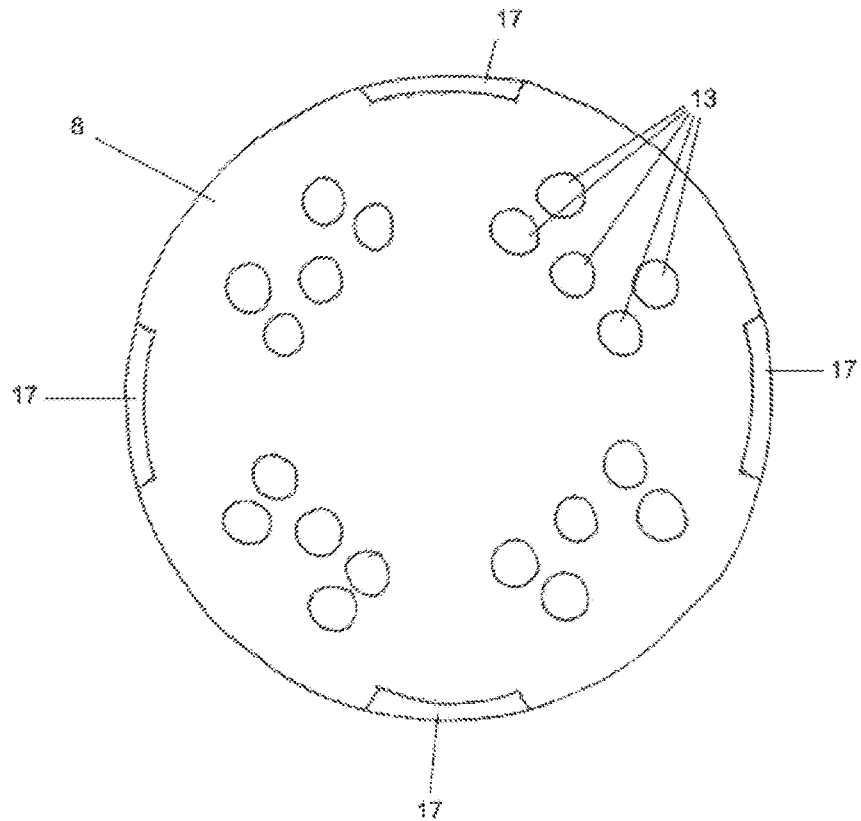
FIG. 2a is a plan view of the outer shell of the inlet assembly of FIG. 1.

FIG. 2a shows in greater detail the outer shell 8. This has a substantially circular shape. In alternative embodiments, however, the outer shell 8 may have any desired shape. Also in the embodiment shown, a plurality of intakes 13 are distributed across the surface of outer shell 8. However the outer shell 8 may comprise one intake or more than one intake and the one or more intakes 13 may be located at any desired position within the outer shell 8. As shown in FIG. 2a, the outer shell 8 may further comprises one or more openings 17 for a plurality of visibility devices 18 housed within the core 9, as will be described with reference to FIG. 4a.

Figure 2B:
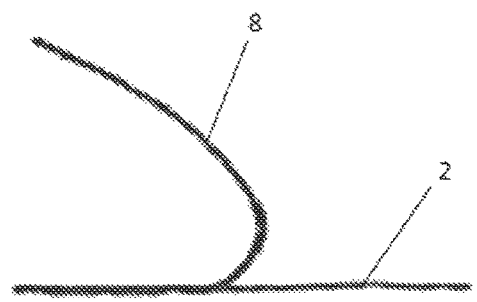
FIG. 2b is a side elevation of the peripheral edge of the outer shell of FIG. 2.

As shown in FIG. 2b, the outer shell 8 has a rounded peripheral edge arranged to form a seal to the road surface 2. Advantageously, this further prevents the intake of water into the at least one inlet assembly and acts to cushion the impact of the peripheral edge of the outer shell against the road surface when a wheel passes over the inlet assembly 1.

Figure 3:
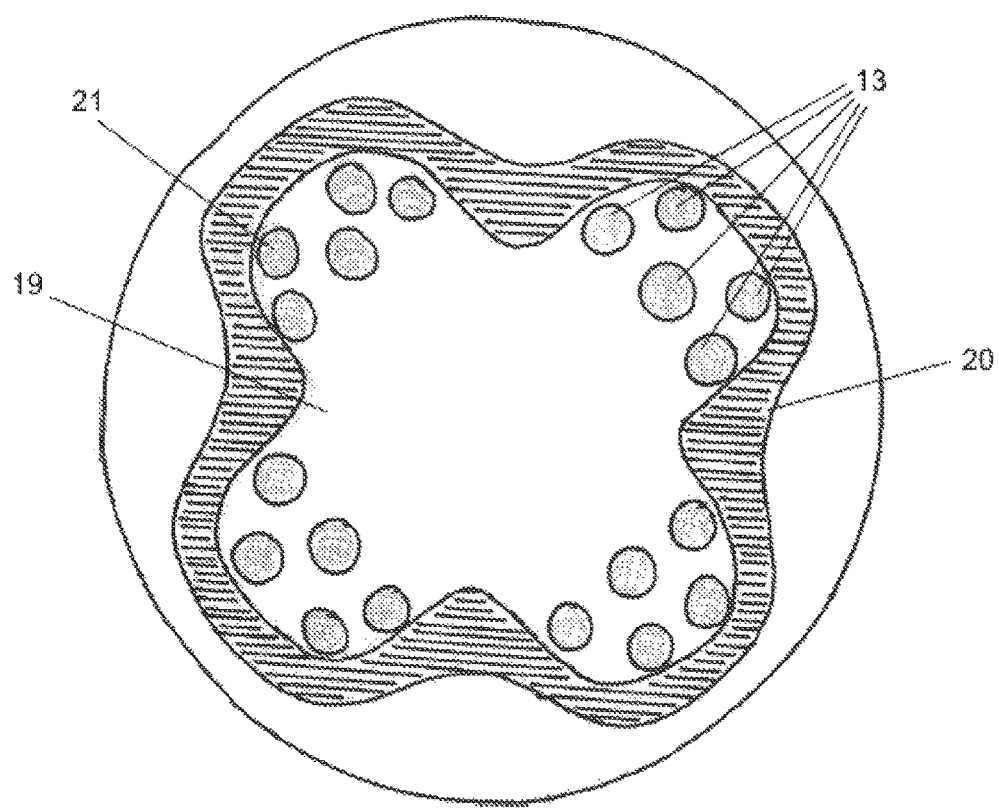
FIG. 3 is a plan view of the support plate of the inlet assembly of FIG. 1.

The inlet assembly 1 has support plate 19 located beneath the outer shell 8 or embedded in the outer shell 8. Intakes 13 are formed through outer shell 8 and support plate 19 as shown in FIG. 3. Support plate 19 supports outer shell 8 as a wheel passes over the inlet assembly 1. In order to provide effective support, support plate 19 is formed of a substantially rigid material, such as metal, plastic or a rubber which is more rigid than that from which the outer shell 8 is formed. Support plate 19 has a flexible surrounding 20 to allow the support plate to compress and resile in response to the action of a wheel passing over the inlet assembly 1.

The pod may further comprise a mesh material 21 arranged to cover the one or more intakes 13 to prevent the inlet of water droplets to the inlet assembly 1. As shown in FIG. 3, the mesh material 21 may be housed in the support plate 19. The mesh material 21 may be arranged to protrude through the outer shell 8 and above the upper surface of the pod 7, to assist the run-off of water droplets from the upper surface of the pod 7. Alternatively, the mesh material 21 may be continuous with the outer shell 8.

Figure 4A:
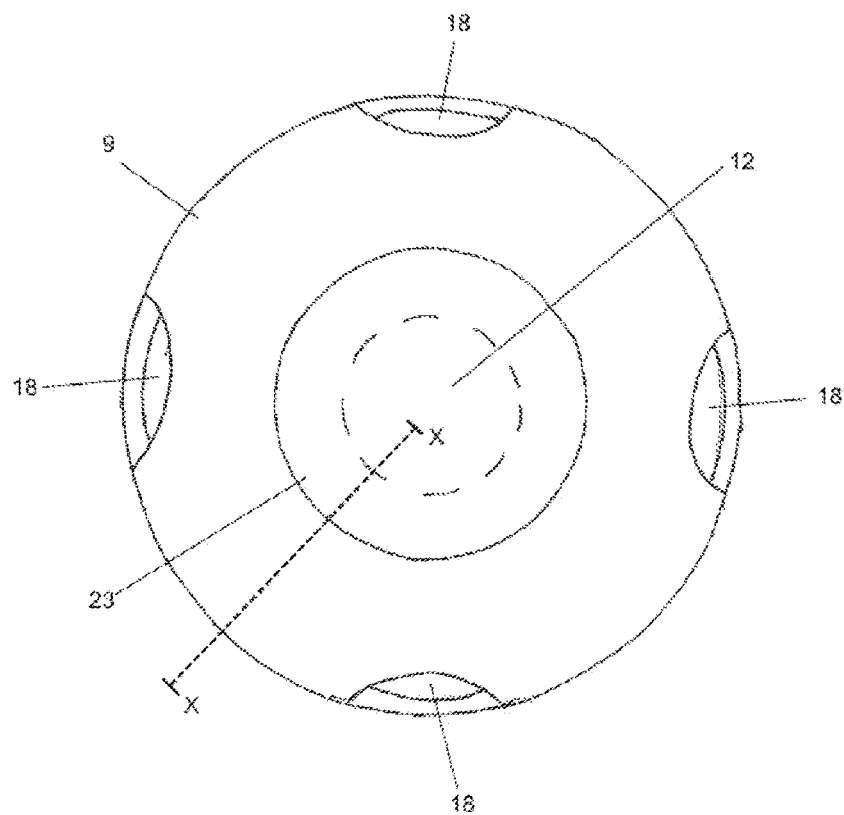
FIG. 4a is plan view of the core of the inlet assembly of FIG. 1.
Figure 4B:
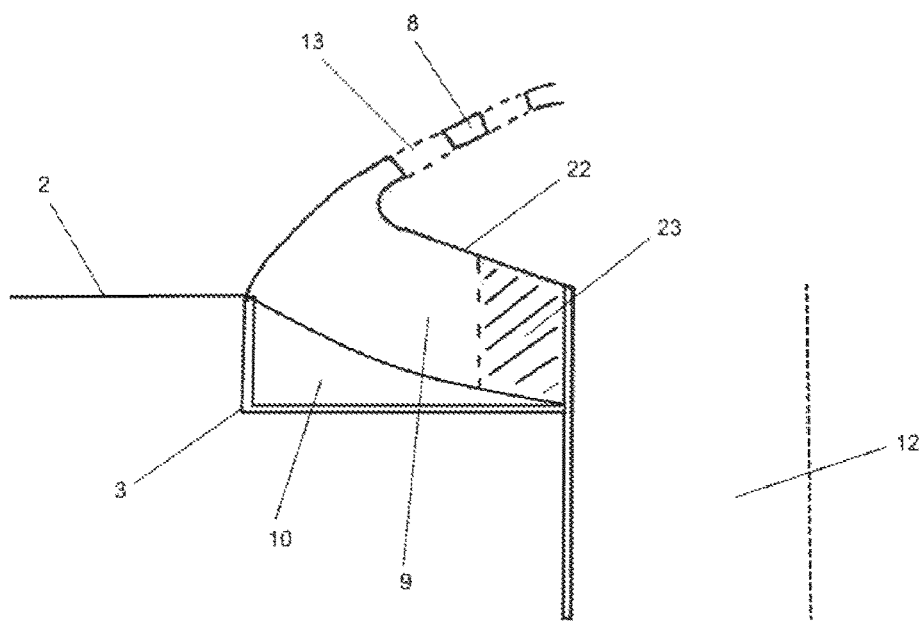

With reference to FIG. 4a and FIG. 4b the core 9 has an internal edge 22 which is sloped generally downwards towards the passage 12, defining the internal cavity 11. The core 9 further comprises a hardened portion 23 surrounding the passage 12 to assist in strengthening the core 9.

According to the embodiment shown in FIG. 4a, core 9 comprises a plurality of visibility devices 18, positioned to be aligned with the openings 17 of the outer shell 8. In one embodiment, the visibility devices 18 may comprise reflectors arranged to reflect the light of passing vehicles. Preferably, the reflectors are retroreflectors such that light is reflected back to the source with minimal scattering. In an alternative embodiment, the visibility devices 18 may comprise lighting units. The lighting units may be arranged to improve the visibility of the inlet assembly, or the lighting units may further be arranged to illuminate a portion of the road surface in the vicinity of the inlet assembly providing additional road surface lighting. Preferably, the lighting units are LEDs or similar such as SMD's. Any combination of reflectors and lighting units may be used. According to one embodiment of the present invention, the system may comprise a plurality of inlet assemblies 1 aligned in a road surface to provide reflective and/or illuminated traffic delineation markings, as will be described with reference to FIG. 18.

Figure 5:
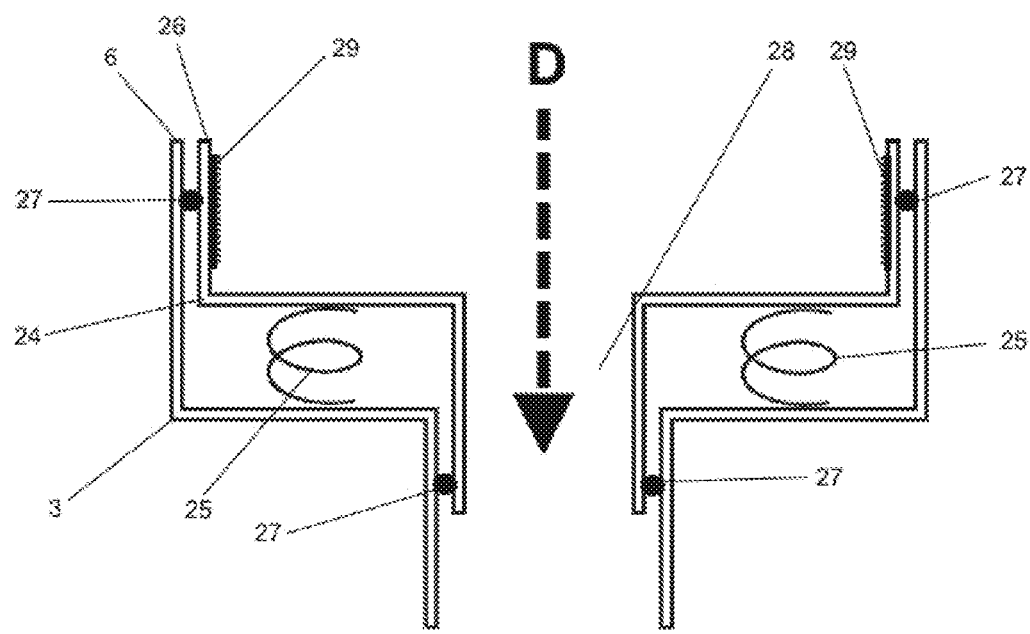
FIG. 5 is a cross-sectional side view of a base unit having a sub-housing according to one embodiment of the present invention.

FIG. 5 is a side view of one embodiment of base unit 3. The base unit 3 further comprises sub-housing 24, which is biased to a raised position by springs 25. The sub-housing 24 has an upper edge 26 which is arranged to be substantially flush with the upper edge of the base unit 6, when the sub-housing 24 is in a raised position. Sub-housing 24 is connected to base unit 3 by means of one or more slideable connectors 27, which allow the sub-housing 24 to retract into the base unit 3. The sub-housing 24 comprises a duct portion 28 which is arranged to engage with an extraction duct (not shown), and a threaded wall 29. The sub-housing 24 is thereby arranged to accommodate pod 7, wherein the threaded wall 29 of the sub-housing 24 engages with the threaded outer wall of the seat 10 and the passage 12 is accommodated within the duct portion 28 of the sub-housing 24.

When the pod 7 is inserted into the sub-housing 24, the outer shell 8 protrudes above the level of the road surface 2. As such, a wheel passing over the inlet assembly 1 will urge the pod 7 against the base of the sub-housing 24, causing the sub-housing 24 to retract into the base unit 3 in the general direction D shown in FIG. 5. Once the wheel has passed over the inlet assembly 1, springs 25 will bias the sub-housing 24 back to a raised position, such that the upper edge 26 of the sub-housing 24 is substantially flush with the upper edge 6 of the base unit 3 and with the road surface 2.

Further embodiments of the inlet assembly of the present invention will now be described. Whilst the inlet assemblies according to a first embodiment illustrated in FIGS. 1 to 5 have a generally circular configuration, the second to fourth embodiments illustrated in FIGS. 6 to 17 have a generally linear configuration. However, it will be apparent that a number of the features described in connection with specific embodiments having specific shapes and configurations can be equally employed in inlet assemblies having shapes and configurations other than that described.

Figure 6:
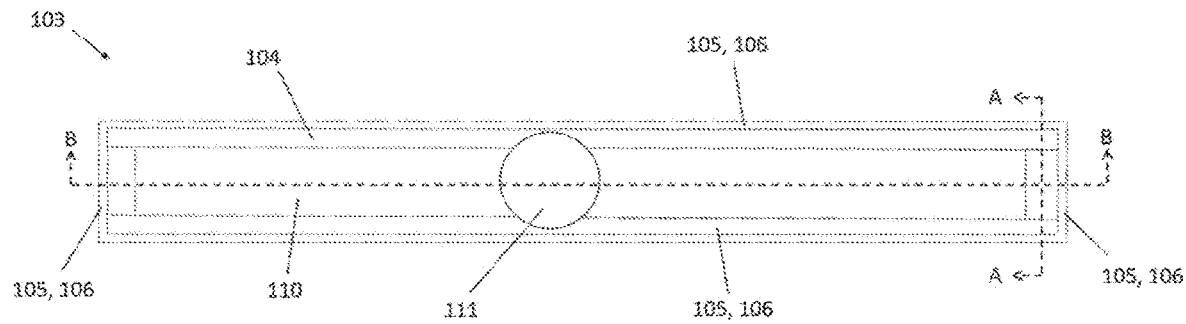
FIG. 6 is a plan view of a base unit suitable for use in an inlet assembly in accordance with any one of the second to fourth embodiments of the present invention.
Figure 7:
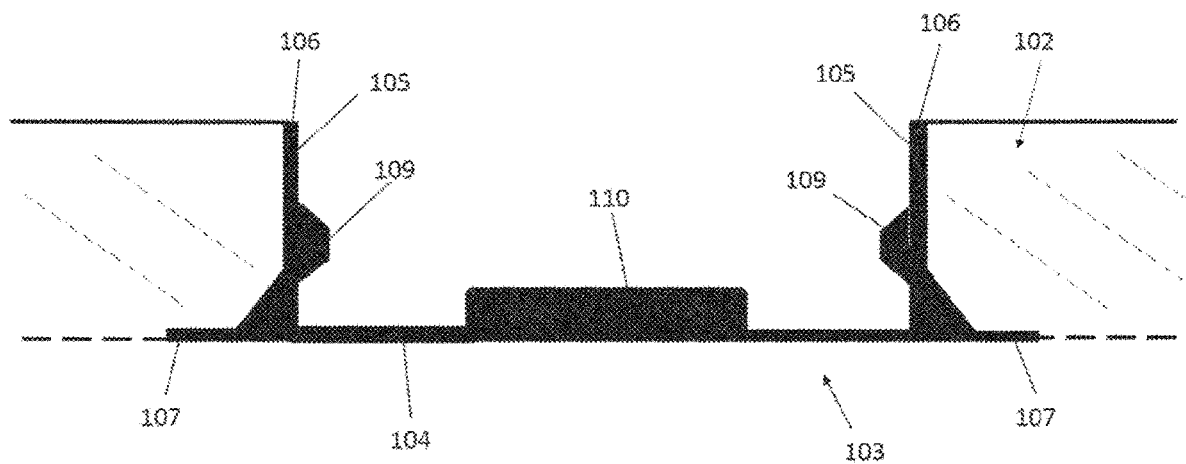
FIG. 7 is a cross-sectional view of the base unit of FIG. 6 through section A-A.
Figure 8:
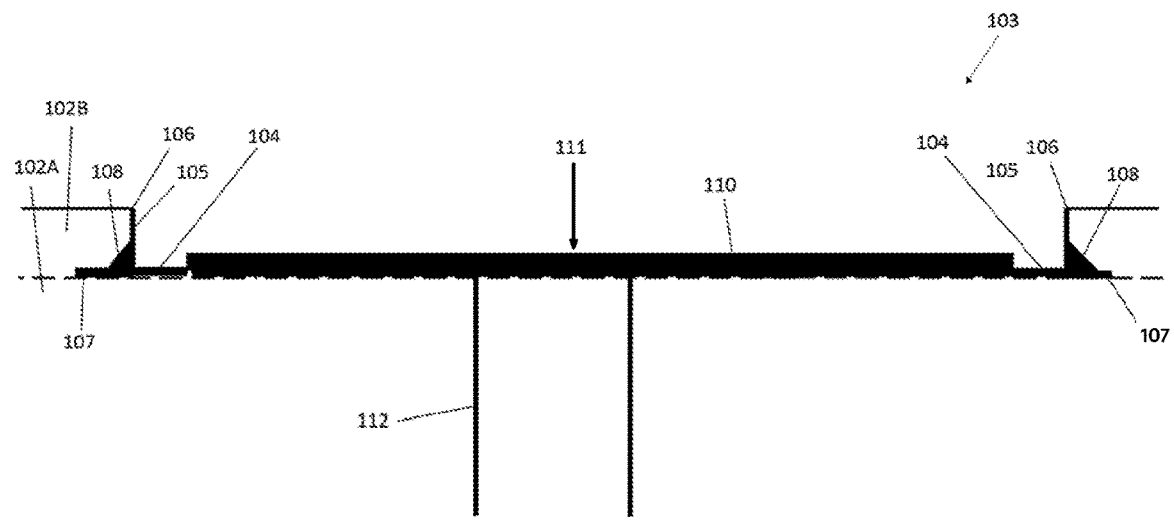
FIG. 8 is a cross-sectional view of the base unit of FIG. 7 through section B-B.

As for the first embodiment, each of the second to fourth embodiments comprise a base unit arranged to be recessed into the road surface. A base unit 103 suitable for use in each of the second to fourth embodiments of the inlet assembly is shown in FIGS. 6 to 8. Base unit 103 comprises a bottom portion 104 and a plurality of side walls 105. Each side wall 105 has an upper edge 106 which, in use, is arranged to be substantially flush with the level of the road surface 102.

As shown in FIGS. 7 and 8, the bottom portion 104 extends outwardly from the side walls 105 to define a flange 107, which flange 107 is, in use, embedded into the road surface 102 so as to securely position the base unit 103 in position in the road surface 102. In a typical installation the bottom portion 104 of the base unit 102 is positioned in a desired location on a concrete road base 102a. A layer or tarmac 102b is then laid on top of the concrete road base 102a at least in the area surrounding the inlet assembly, such that the flange becomes embedded between the concrete road base 102a and the tarmac layer 102b. The base unit 103 further comprises brace members 108 extending diagonally between an upper surface of the flange 107 and the outer surface of the side wall 105, so as to provided additional structural stability to the base unit 103.

The base unit 103 further comprises retaining members 109 projecting inwardly from side walls 105. Retaining members 109 are arranged to engage with a pod inserted into the base unit 103, so as to retain the pod within the base unit 103. A raised middle section 110 is formed in the bottom portion 104 of the base unit 103, which facilitates engagement of a pod within the base unit 103, and which in combination with an inserted pod, defines an internal cavity of the inlet assembly. The functions of the retaining members 109 and the raised middle section 110 are described in greater detail below, with reference to the second to fourth embodiments of the pod.

With reference to FIGS. 6 and 8, the base unit comprises a duct hole 111 which serves as an opening for extraction duct 112, which extraction duct extends below the base unit 103 for the extraction of exhaust gases and particulate matter from the inlet assembly. In some embodiments, a barrier may be provided around the periphery of the duct hole 111, which extends above the level of the bottom portion 104 and/or the raised middle section 110. Provision of a barrier around the duct hole 111 inhibits any water which may collect within the base unit from entering the extraction duct 112. Any collected water may be removed by use of a sump pump or other appropriate means.

Figure 9:
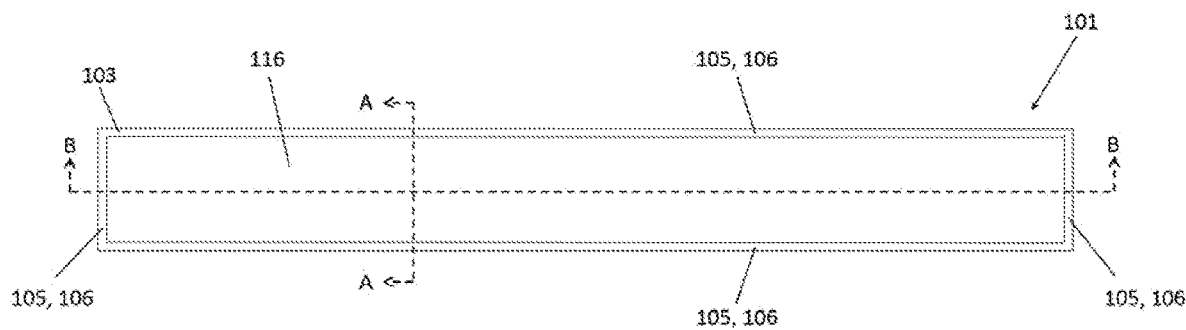
FIG. 9 is a plan view of an inlet assembly according to any one of the second to fourth embodiments of the present invention.

FIG. 9 is a plan view of a linear inlet assembly according to any one of the second to fourth embodiments described below. As viewed from above, the second to fourth embodiments of the inlet assembly have a generally linear configuration.

FIGS. 10 to 13 show an inlet assembly 101 according to a second embodiment of the present invention. The inlet assembly 101 comprises a pod 113 having a compressible body 114. The compressible body 114 comprises a head section 115 arranged to protrude above the level of the road surface 102. The upper surface of the head section 115 defines an outer surface 116 of the pod 113, which is arranged, in use, to be contacted by a wheel passing over the pod 113. To facilitate passage of the wheel onto the outer surface 116 of the pod 113, the longitudinal ends 116a of the upper surface 116 are bevelled, as shown most clearly in FIG. 13. This reduces the impact of a wheel coming into contact with the pod 113, thus helping to prolong the lifetime of the pod 113.

The head section 115 is supported by a plurality of side walls 117. In the illustrated embodiment, the head section 115 and the side walls 117 are formed unitarily. In order to secure the pod 113 within the base unit 103, the side walls 117 are provided with engagement apertures 118 located so as to coincide with retaining members 109 of the base unit 103. When the pod 113 is inserted into the base unit 103, retaining members 109 protrude from the side walls 105 of the base unit 103 into the engagement apertures 118 formed in the side walls 117 of the pod 113, thus preventing the pod 113 from being pulled out of the base unit 103 vertically and retaining the pod 113 within the base unit 103. The raised middle section 110 formed in the bottom portion 104 of the base unit 103 prevents the side walls 117 of the pod 113 from moving laterally, thus helping to secure the pod 113 within the base unit 103. The engagement apertures 118 may extend through the entire side wall 117 of the pod 113, as shown, however they may alternatively comprise recesses formed in the side wall 117 with sufficient depth to receive a corresponding retaining member 109.

Figure 10:
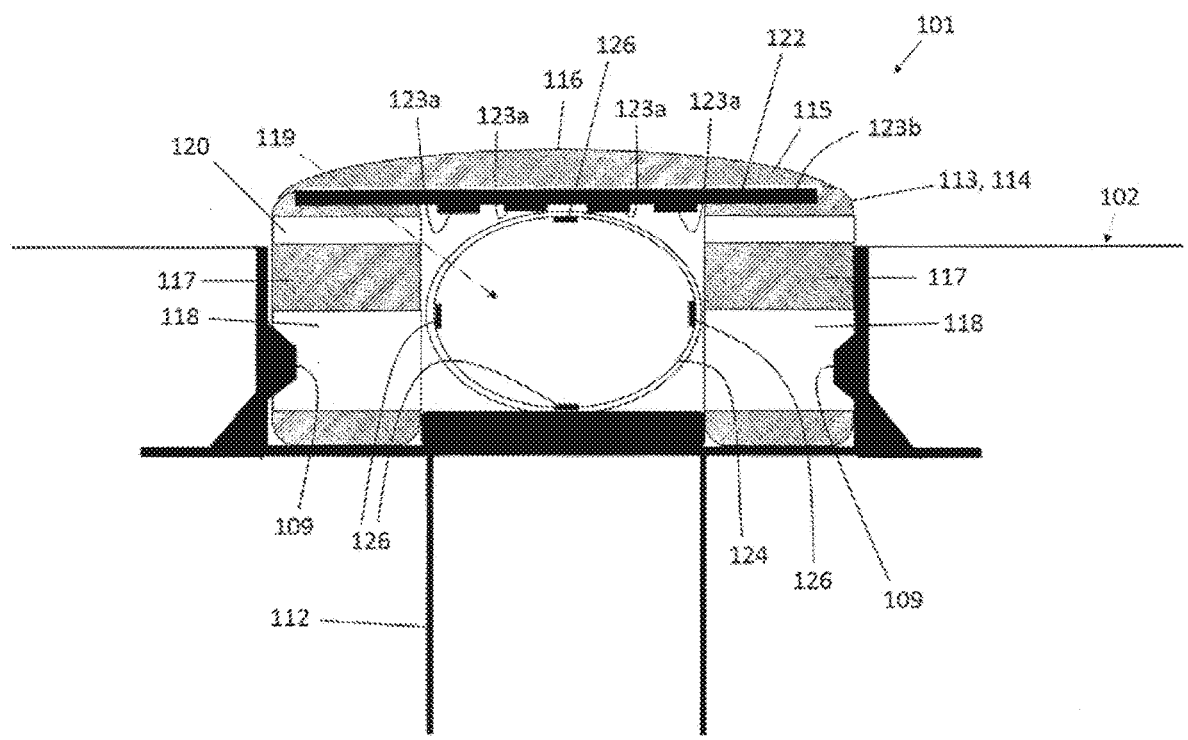
FIG. 10 is a cross-sectional view of an inlet assembly according to a second embodiment of the present invention, through section A-A indicated in FIG. 9.
Figure 12:
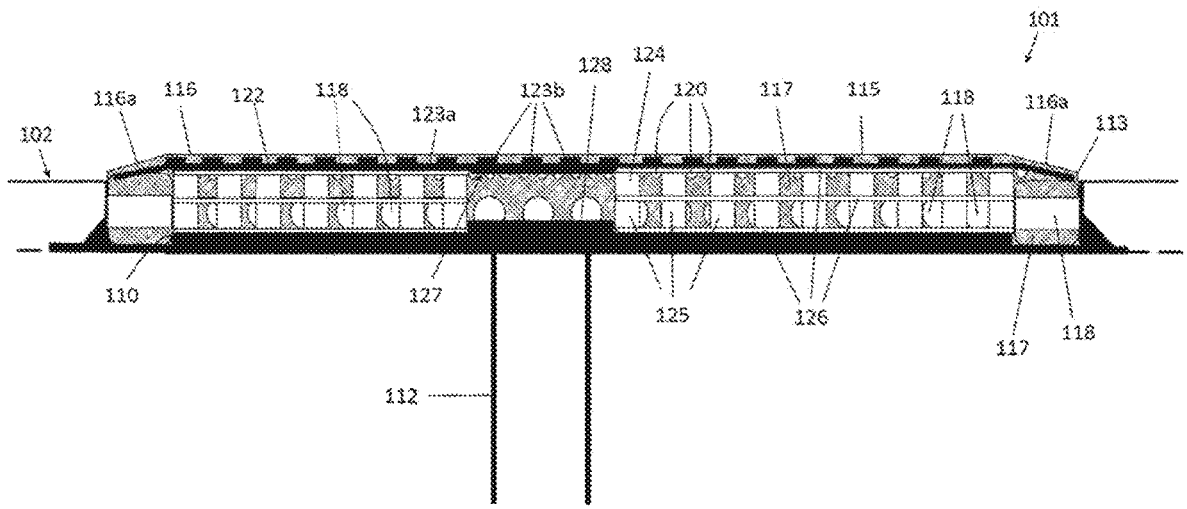
FIG. 12 is a cross sectional view of the inlet assembly of FIGS. 10 and 11, through section B-B indicated in FIG. 9.
Figure 13:
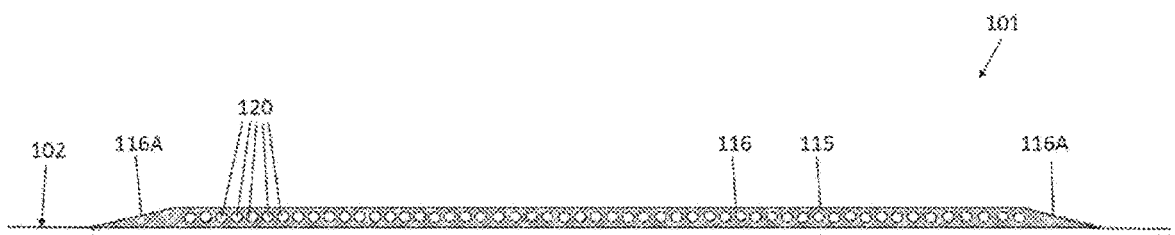
FIG. 13 is a side elevation of the inlet assembly of FIGS. 10 to 12, showing the head section protruding above the level of the road surface.

In combination, the pod 113 and the raised middle section 110 of the bottom portion 104 of the base unit 103 define an internal cavity 119. However, in the absence of a raised middle section, the internal cavity would be defined by the pod and the bottom portion of the base unit. A plurality of intake apertures 120 are formed in the side walls 117 of the pod 113, which extend from an outer surface of the side wall 117 to the internal cavity 119. The intake apertures 120 are located in the side walls 117 of the pod such that they are positioned above the level of the road surface 102 when the pod 113 is in a raised position as shown in FIGS. 10, 12 and 13. The internal cavity 119 forms a central duct running along the length of the pod 113, which connects the intake apertures 120 to the extraction duct 112. Accordingly, the inlet assembly 101 provides a pathway for the passage of exhaust gasses from the vicinity of the road surface 102, through the intake apertures 120, into the central duct formed by the internal cavity 119 and subsequently into the extraction duct 112.

Where the engagement apertures 118 extend through the entire side wall 117, these provide an additional pathway for exhaust gas to enter into the internal cavity 119. However, it will be appreciated that the extraction of exhaust gases from the vicinity of the road surface will occur primarily through the intake apertures 120 which are positioned above the level of the road surface 102.

Figure 11:
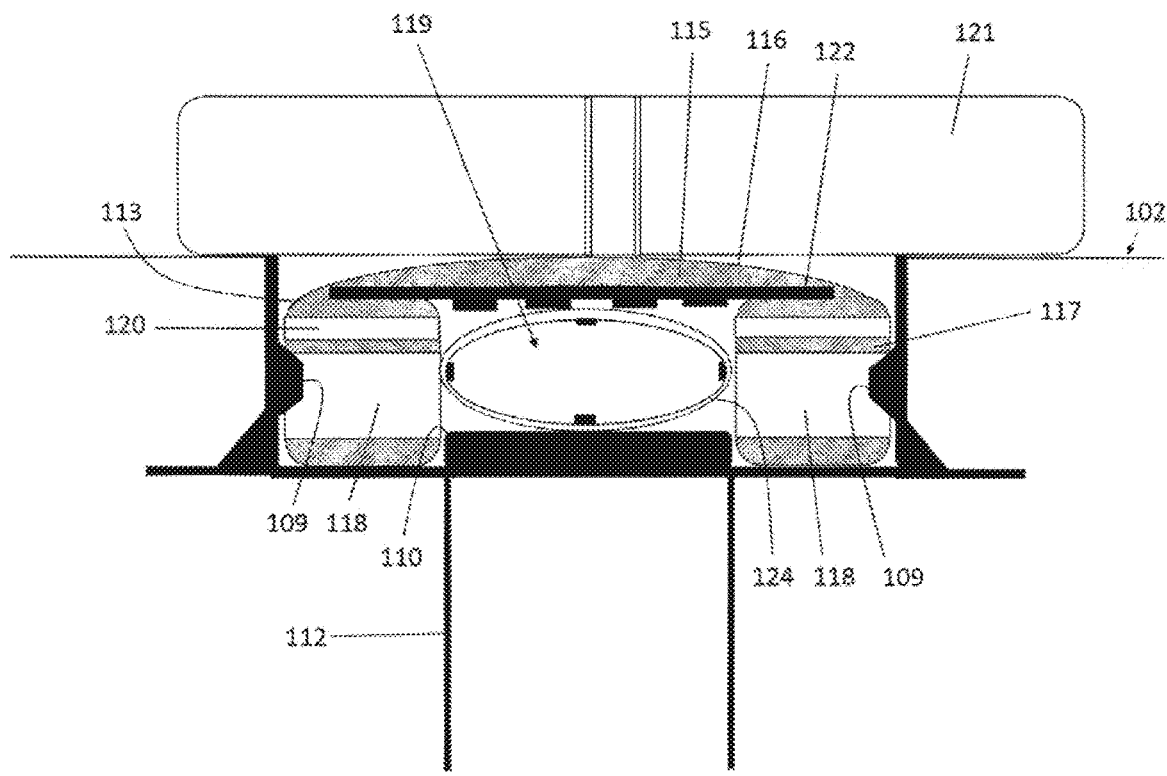
FIG. 11 is a cross-sectional view of the inlet assembly of FIG. 10 as a wheel of a vehicle passes over the inlet assembly.

As shown in FIG. 11, the compressible body 114 of the pod 113 is arranged to compress into the base unit 103 when driven over by the wheel of a vehicle 121, such that at least a portion of the upper surface 116 of the pod 113 is substantially flush with the level of the road surface 102. After the wheel 121 has passed over the pod 113, the resilience of the pod 113 allows it to return to a raised position, such that it protrudes above the level of the road surface 102. In order to facilitate this, the compressible body 114 is formed from an inherently resilient material, such as an industrial rubber or other elastomer.

To provide additional stability to the compressible body 114, a relatively rigid support plate 122 may be embedded within, or provided on an underside of, the head section 115. In the illustrated embodiment, support plate 122 comprises longitudinal support slats 123a extending along the length of the pod 113 and transverse support slats 123b extending across the width of the pod 113. The support plate 122 helps to distribute the load of a wheel passing over the pod 113 along the length and width—of the pod 113. As shown in FIG. 12, longitudinal support slats 123a are angled to follow the bevelled longitudinal ends 116a of the upper surface 116 of head section 115. Accordingly, longitudinal support slats 123a are able to extend as far as possible along the entire length of the pod 113.

A spring member 124 is provided in the internal cavity 119 in order to provide further support to the pod 113 under an applied load, and to contribute to the resilience of the pod 113 when the load is released. In the embodiment shown, the spring member 124 comprises a plurality of resiliently compressible rings 125 displaced longitudinally along the length of the internal cavity 119, and connected by longitudinally extending connecting members 126 attached to an inner surface of each ring 125. The connecting members 126 are preferably metal strips, as shown, however any elongate member, such as a connecting bar, may alternatively be used. In alternative embodiments, the spring member 124 may comprise a helical spring arranged to extend longitudinally along the length of the internal cavity 116, such that each of the individual coils of the helical spring contact the underside of the head section 115 (or the support plate 122) and the raised middle section 110 of bottom portion 104.

FIG. 11 illustrates the compression of the pod 113 when a wheel 121 passes over the head section 115. The spring member 124 compresses to allow the pod 113 to retract into the base unit 103 such that the upper surface 116 is substantially flush with the level of the road surface 102. At this time, the spring member 124 provides an opposing force to the underside of the head section 115, thus acting to support the head section 115 as the wheel 121 passes over the pod 113. After the wheel 121 has passed over the head section 115, the spring member 124 can expand, thus supplying an upward force to the underside of the head section 115 and assisting the pod 113 to return to a raised position.

As shown in FIG. 12, the spring member 124 is not provided in a central region of the internal cavity 119, said central region corresponding to the position of the duct hole 111 in the bottom portion 104 of the base unit. Accordingly, an additional support plate 127 is provided beneath the support plate 122 to strengthen the head section of the pod in this region.

As shown in FIG. 12, a barrier 128 is provided around the periphery of the duct hole 111, which extends above the level of the raised middle section 110 so as to inhibit the ingress of water into the extraction duct 112.

Figure 14:
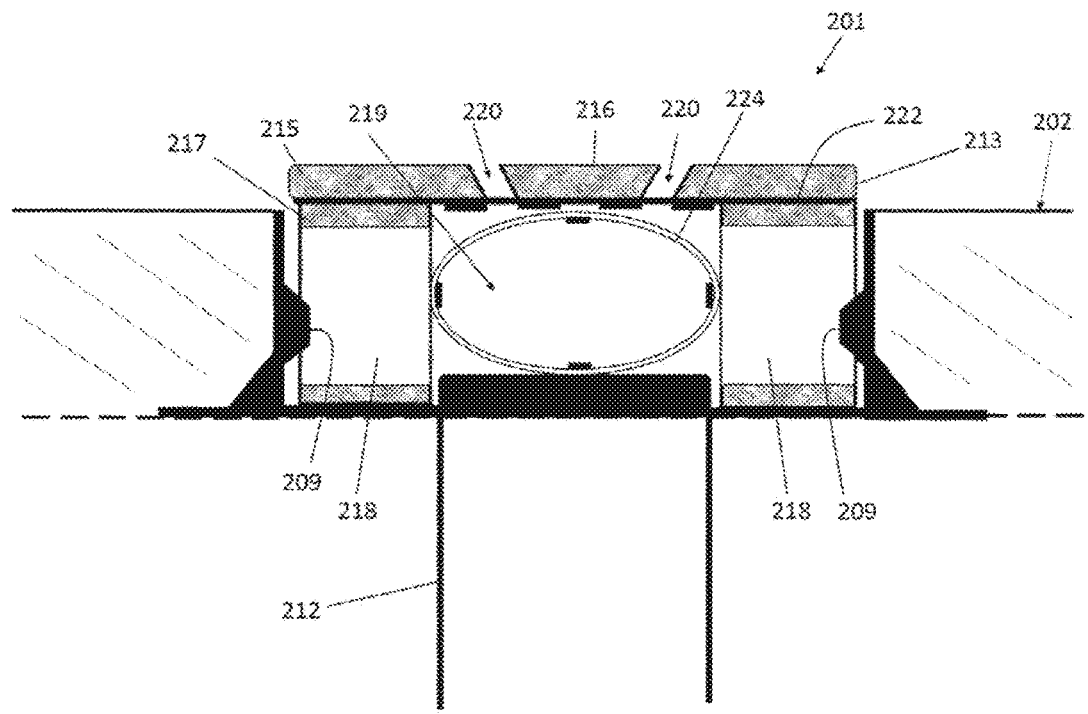
FIG. 14 is a cross-sectional view of an inlet assembly according to a third embodiment of the present invention, through section A-A indicated in FIG. 9.
Figure 15:
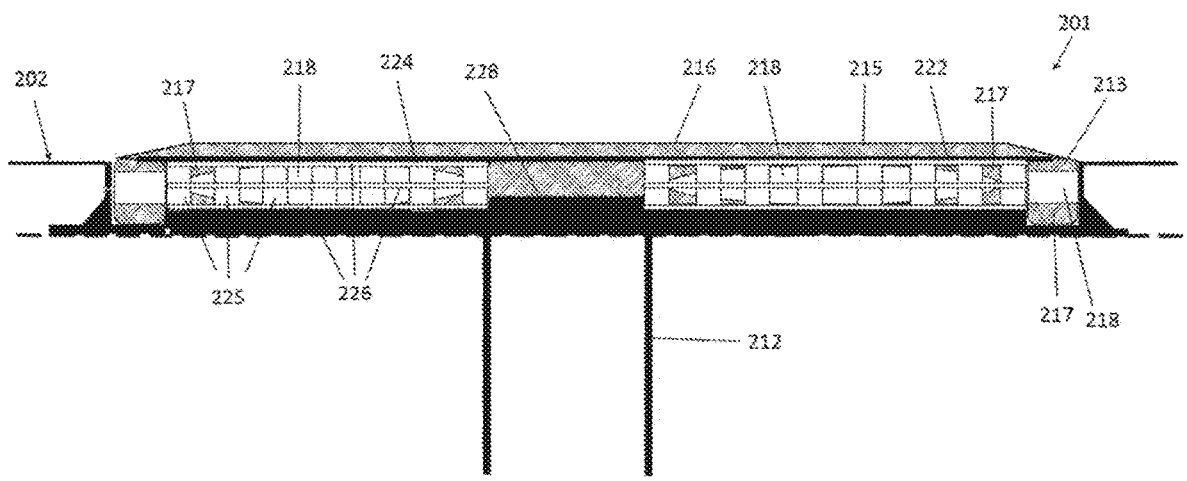
FIG. 15 is a cross sectional view of the inlet assembly of FIG. 14, through section B-B indicated in FIG. 9.

FIGS. 14 and 15 illustrate a third embodiment of an inlet assembly 201 according to the present invention. The inlet assembly 201 illustrated in FIGS. 14 and 15 includes features equivalent to those of the second embodiment of the present invention described above, thus description of these features will not be repeated.

Inlet assembly 201 comprises a pod 213 having intake apertures 220 formed in head section 215 thereof, which intake apertures 220 extend from the upper surface 216 to the internal cavity 219. Large engagement apertures 218 are formed in the side walls 217 of the pod 213, which primarily act to engage the retaining members 209 of the base unit 203 so as to retain the pod 213 within the base unit 203. Due to the large size of the engagement apertures 218, these also act as intake apertures for the passage of exhaust gases from the vicinity of the road surface 202 into the internal cavity 219. However, extraction of exhaust gases is primarily achieved through the intake apertures 220 formed in the head section 215.

In contrast to the second embodiment described above, in the third embodiment the head section 215 and the side walls 217 of pod 213 are separately formed. Support plate 222 is provided on an underside of the head section 215 and connects the head section 215 to the side walls 217.

As shown in FIG. 15, a barrier 228 is provided around the periphery of the duct hole 211, which extends above the level of the raised middle section 210 so as to inhibit the ingress of water into the extraction duct 212.

Figure 16:
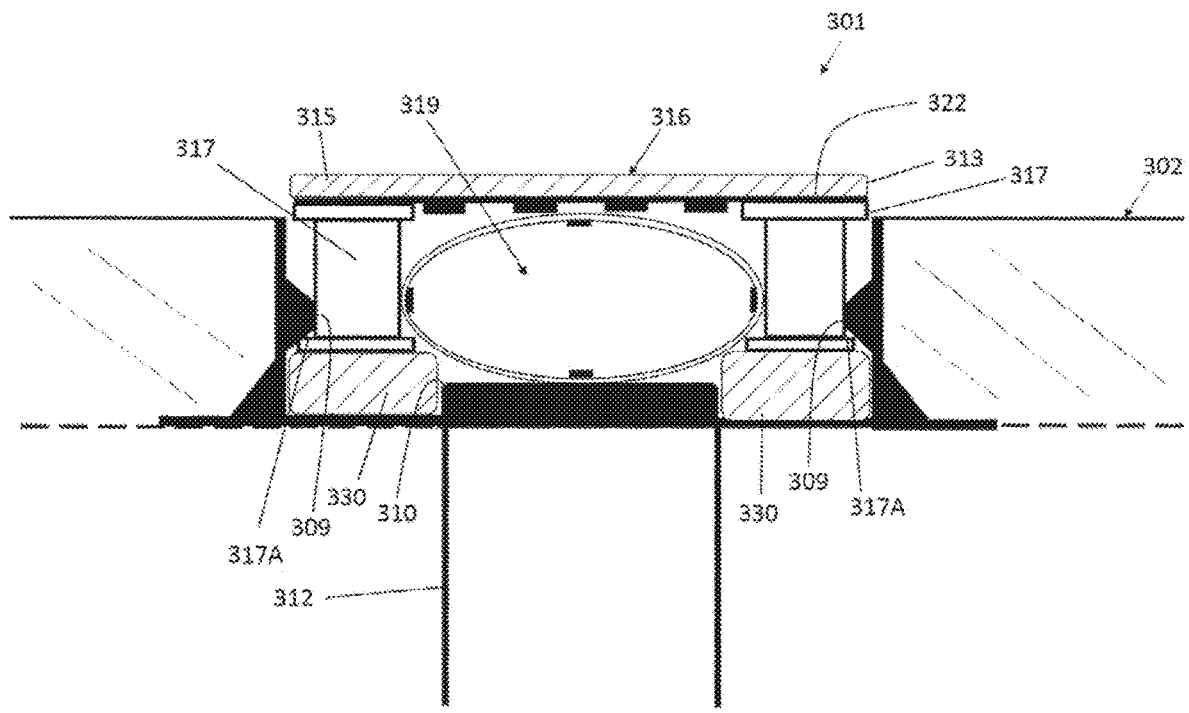
FIG. 16 is a cross-sectional view of an inlet assembly according to a fourth embodiment of the present invention, through section A-A indicated in FIG. 9.
Figure 17:
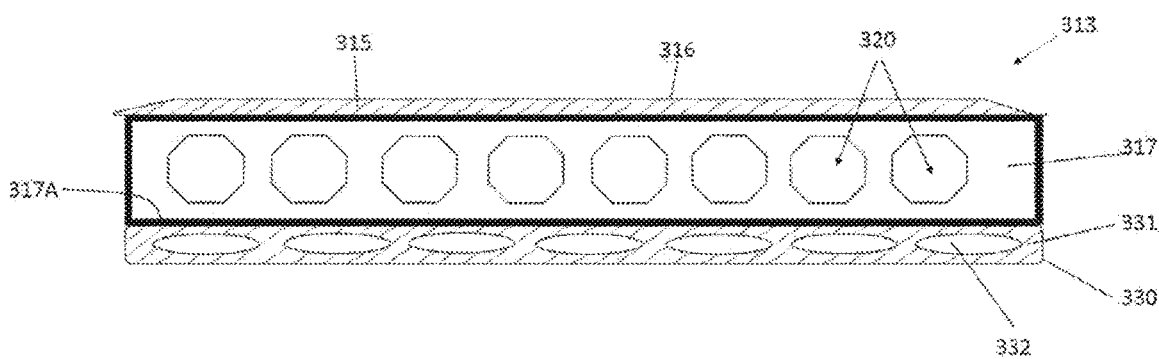
FIG. 17 is a cross sectional view of the inlet assembly of FIG. 16, through section B-B indicated in FIG. 9.

A fourth embodiment of the inlet assembly 301 is illustrated in FIGS. 16 and 17. Inlet assembly 301 shares features in common with the second and third embodiments described above, and thus description of these common features will not be repeated.

Pod 313 comprises a head section 315 having a support plate 322 provided on the underside thereof. The pod 313 comprises side walls 317 extending along each of the longitudinal edges of the pod 313, which in this embodiment comprise rigid castellated beams, as shown most clearly in FIG. 17. The castellated beam side walls 317 comprise intake apertures 320 arranged to allow the passage of exhaust gases from the vicinity of the road surface 302 into the internal cavity 319.

The castellated beam side walls 317 are supported by compressible support members 330 positioned underneath the side walls 317. The compressible support members 330 are arranged to bias the pod 313 to a raised position, such that the head section 315 protrudes above the level of the road surface 302. However, the compressible support members 330 are able to compress, such that when a wheel passes over the outer surface 316 of the pod 313, the pod 313 is able to retract into the base unit 303, such that the upper surface 316 is substantially flush with the level of the road surface 302. In this arrangement, the load applied on the pod 313 by the wheel is dispersed through the castellated beam along its length. After the wheel has passed over the pod, the compressible support members 330 force the pod 313 into a raised position.

In the embodiment shown, compressible support members 330 comprise compressible beds 331 formed of a compressible material (such as industrial rubber), which beds 331 are provided with apertures 332 to facilitate compression of the beds 331. In alternative embodiments, the compressible support members 330 comprise a plurality of industrial springs encased within the compressible beds 331.

As shown in FIG. 17, each compressible support member 330 is provided along the length of the castellated beam side wall 317, and comprises a single compressible bed 331. A plurality of industrial springs may be provided along the length of the side wall 317. In alternative embodiments, a plurality of compressible support members may be provided along the length of the side wall 317, each compressible support member comprising a compressible bed, each of which may or may not contain one or more industrial springs. In yet further embodiments, the compressible beds may be omitted, and each compressible support member 330 may simply comprise an industrial spring arranged to support the castellated beam side wall 317.

The retaining members 309 of the base unit 303 are arranged to engage a lower flange 317a of the castellated beam side wall 317, so as to retain the pod 313 within the base unit 303. The retaining members 309 protrude from the side walls 305 of the base unit 303 so as to prevent the pod 313 from being pulled out vertically and thus retaining the pod 313 within the base unit 303. The raised middle section 310 formed in the bottom portion 304 of the base unit 303 prevents the compressible support member 330 of the pod 313 from moving laterally, thus helping to secure the pod 313 within the base unit 303.

Figure 18:
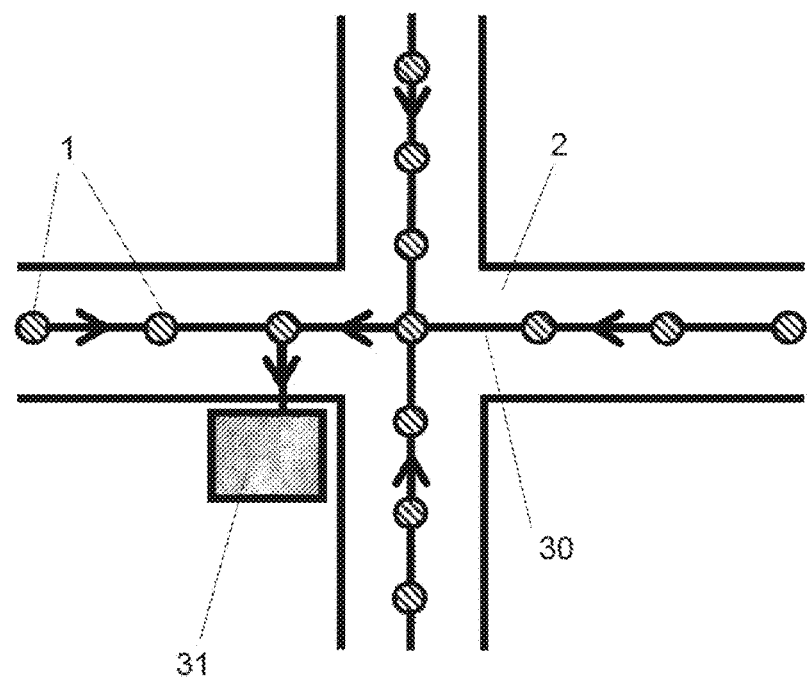
FIG. 18 is a schematic diagram of a system for extracting polluted air from the vicinity of a road surface according to the present invention.

FIG. 18 is a schematic diagram of a system for extracting polluted air in the vicinity of a road surface 2 according to the present invention. This comprises a plurality of inlet assemblies 1 according to the first embodiment described above, which are positioned within the road surface 2, an extraction duct 30 below the road surface which connects the plurality of inlet assemblies 1, and a filtration unit 31 connected to the extraction duct 30. The system may further comprise one or more fans configured to draw air from the road surface, through each of the inlet assemblies 1 and into the extraction duct 30. The filtration unit 31 is configured to receive air from the duct 30, to filter hazardous gases and extract particulate matter from the air and to return the purified air back into the atmosphere.

In preferred embodiments of the system, the inlet assemblies are positioned near the top of the camber of the road in which they are installed. Accordingly, any surface water collecting on the road surface will naturally drain away from the inlet assemblies towards the lateral edges of the road, thus limiting water ingress into the system.

As shown in FIG. 18, the plurality of inlet assemblies 1 can be aligned in the road surface 2 to provide reflective and/or illuminated traffic delineation markings by means of the visibility devices 18 contained within each inlet assembly 1. The provision of traffic delineation markings, whilst simultaneously providing extraction of polluted air in the vicinity of the road surface in one system is a particular advantage of the present invention. The system may be of particular benefit in areas of high congestion and slow moving traffic.

Figure 19:
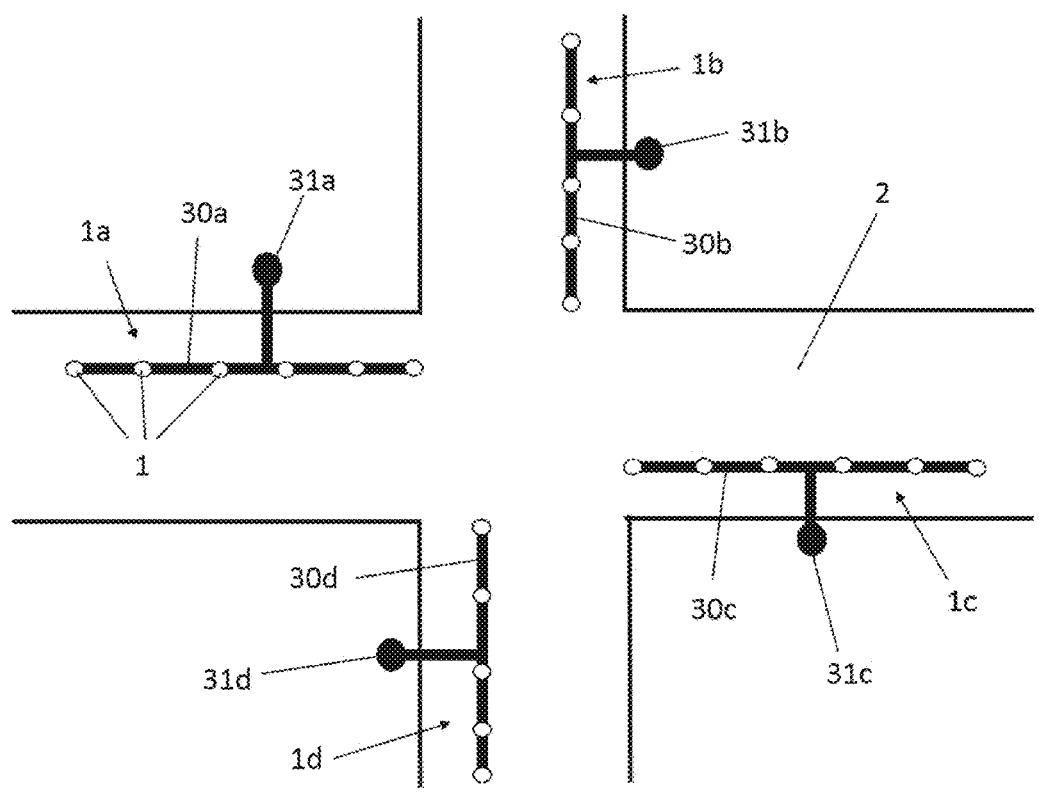
FIG. 19 is a schematic diagram of an alternative configuration of a system for extracting polluted air from the vicinity of a road surface according to the present invention.

FIG. 19 shows an alternative arrangement of inlet assemblies 1 arranged in road surface 2. In the illustrated embodiment, an array of inlet assemblies 1a, 1b, 1c, 1d is positioned in each road approaching a 4-way intersection or crossroads. An extraction duct 30a, 30b, 30c, 30d connects the inlet assemblies 1 of each array 1a, 1b, 1c, 1d, and a filtration unit 31a, 31b, 31c, 31d is connected to each extraction duct 30a, 30b, 30c, 30d. However, it will be appreciated that each array 31a, 31b, 31c, 31d may be connected to a common filtration unit, or may share a common filtration unit with any one or more of the other inlet assembly arrays.

Each array of inlet assemblies 1a, 1b, 1c, 1d is positioned in the lane or lanes in which traffic is expected to slow or stop, for example when held at a traffic signal, since this is the area in which the concentration of exhaust gas is expected to be highest. Thus, in countries in which traffic drives on the left (as in the illustrated embodiment), arrays of inlet assemblies will be positioned in the left-hand lane or lanes. Arrays of inlet assemblies may be placed in any area of a road in which traffic is expected to slow or stop, such as in the approach to junctions, pedestrian crossings or crosswalks, or roundabouts, for example.

Whilst the systems illustrated in FIGS. 18 and 19 comprise a plurality of inlet assemblies 1 according to the first embodiment, which have a generally circular configuration, it will be appreciated that any of the inlet assemblies described herein may be utilised in such a system. Moreover, any combination of inlet assemblies according to any of the embodiments described may be employed according to the specific requires of any particular installation.

Although not shown, other features could be provided in the pod of any of the inlet assemblies described herein, for example a flow sensor to indicate the rate of extraction through that pod, or a proximity sensor, for example, to indicate the presence of vehicles, in response to which the system may be activated or deactivated as appropriate or an appropriate rate of extraction set. Any such sensors may be connected wirelessly to a controller or any such sensors or powered lighting may be wired to an appropriate controller (or power source).

The invention has been described above with reference to specific embodiments, given by way of example only. It will be appreciated that many different arrangements of the system are possible, which fall within the scope of the appended claims.

The invention claimed is:

1. A system for extracting polluted air in the vicinity of a road surface, the system comprising at least one inlet assembly arranged to be recessed into the road surface and to be connected to an extraction duct, said at least one inlet assembly comprising:

a resiliently compressible and/or retractable pod arranged to protrude above the level of the road surface and to be driven over; and intake apertures located within the pod, the pod defining a passage arranged to be connected to an extraction duct, wherein the pod comprises a head section and one or more side walls arranged to support the head section, the head section being arranged to protrude above the level of the road surface and wherein an upper surface of the head section defines an outer surface of the pod, said outer surface being arranged, in use, to be contacted by a wheel passing over the pod; and the pod further comprises a support plate located beneath the head section or embedded within the head section.

2. The system according to claim 1, wherein, when the pod is in a compressed and/or retracted state, an upper surface of the pod is flush with the level of the road surface.

3. The system according to claim 1, wherein the at least one inlet assembly further comprises a base unit arranged to be embedded in a road surface and to accommodate the pod, which base unit comprises an upper edge arranged to be flush with the road surface.

4. The system according to claim 3, wherein the base unit comprises one or more retaining members arranged to engage with the pod so as to retain the pod within the base unit.

5. The system according to claim 3, wherein a bottom portion of the base unit comprises a raised middle section.

6. The system according to claim 3, wherein the base unit comprises an outwardly extending flange, which flange is arranged to be embedded in the road surface so as to securely position the base unit within the road surface.

7. The system according to claim 3, wherein the base unit comprises a sub-housing biased to a raised position.

8. The system according to claim 7, wherein the base unit further comprises a slideable connector arranged to connect the base unit to the sub-housing, and wherein the sub-housing is retractable into the base unit.

9. The system according to claim 1, wherein the head section comprises an outer shell, and wherein the outer shell comprises a rounded peripheral edge arranged to form a seal to the road surface.

10. The system according to claim 1, wherein intake apertures are formed through the head section and the support plate.

11. The system according to claim 1, wherein the side walls are rigid, the pod further comprising at least one compressible support member positioned underneath each side wall.

12. The system according to claim 1, wherein the pod comprises an internal cavity.

13. The system according to claim 1, wherein the intake apertures are raised above the level of the road surface, such that they are above the level of any normally expected surface water.

14. The system according to claim 1, wherein the pod further comprises a mesh material arranged to cover the intake apertures to prevent the inlet of water droplets to the inlet assembly.

15. The system according to claim 1, further comprising:
an extraction duct connected to the at least one inlet assembly; and
an extractor configured to draw air from the road surface, through the at least one inlet assembly and into the extraction duct.

* * * * *